United States Patent
Schneider et al.

(10) Patent No.: US 10,836,382 B2
(45) Date of Patent: Nov. 17, 2020

(54) SYSTEM AND METHOD FOR HANDLING EXCEPTIONAL SCENARIOS

(71) Applicant: LUCAS AUTOMOTIVE GMBH, Koblenz (DE)

(72) Inventors: Georg Schneider, Urbar (DE); Guido Kraus, Greimerath (DE); Philipp Mungenast, Montabaur (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 292 days.

(21) Appl. No.: 15/942,600

(22) Filed: Apr. 2, 2018

(65) Prior Publication Data

US 2018/0334165 A1    Nov. 22, 2018

(30) Foreign Application Priority Data

May 19, 2017    (DE) .......................... 10 2017 004 826

(51) Int. Cl.
*B60W 30/09*    (2012.01)
*G06K 9/00*    (2006.01)
(Continued)

(52) U.S. Cl.
CPC ............ *B60W 30/09* (2013.01); *B60W 10/18* (2013.01); *B60W 10/20* (2013.01); *B60W 30/0956* (2013.01); *B60W 50/0098* (2013.01); *G05D 1/0055* (2013.01); *G06K 9/00825* (2013.01); *B60W 2050/0095* (2013.01); *G05D 2201/0213* (2013.01)

(58) Field of Classification Search
CPC ..... B60W 30/09; B60W 10/18; G06K 30/095
See application file for complete search history.

(56) References Cited

U.S. PATENT DOCUMENTS

2012/0239253 A1*    9/2012    Schmidt ............ B60W 50/0098
                                                    701/41
2013/0211687 A1    8/2013    Trost et al.
(Continued)

FOREIGN PATENT DOCUMENTS

DE    102013209242    11/2014
DE    102013214401    2/2015
(Continued)

*Primary Examiner* — Kira Nguyen
(74) *Attorney, Agent, or Firm* — Tarolli, Sundheim, Covell & Tummino LLP

(57) ABSTRACT

A control system for influencing at least one driver assistance system or comfort system associated with a host motor vehicle when the motor vehicle is in an exceptional scenario, wherein a surroundings sensor system supplies the driver assistance system or comfort system with information concerning the vehicle surroundings and/or the traffic situation the host motor vehicle is in; this driver assistance system or comfort system also influences the longitudinal and/or transverse guidance of the motor vehicle in driving or hazard situations; and for recognizing an exceptional scenario, the control system evaluates the information from the surroundings sensor system and/or a switching device to be actuated by the driver of the motor vehicle in order to at least temporarily switch off, suppress, or reduce the functionality of the at least one driver assistance system or comfort system, based on this evaluation.

12 Claims, 2 Drawing Sheets

(51) Int. Cl.
  *B60W 50/00*  (2006.01)
  *B60W 10/18*  (2012.01)
  *B60W 10/20*  (2006.01)
  *B60W 30/095* (2012.01)
  *G05D 1/00*   (2006.01)

(56) References Cited

U.S. PATENT DOCUMENTS

| | | | |
|---|---|---|---|
| 2015/0307110 A1* | 10/2015 | Grewe | B60W 50/029 |
| | | | 701/36 |
| 2016/0063858 A1* | 3/2016 | Schmudderich | G06K 9/00805 |
| | | | 701/117 |
| 2016/0091325 A1* | 3/2016 | Takamatsu | B60W 30/12 |
| | | | 701/408 |
| 2016/0091897 A1* | 3/2016 | Nilsson | G05D 1/0212 |
| | | | 701/25 |
| 2016/0244029 A1 | 8/2016 | Weston | |
| 2017/0235311 A1* | 8/2017 | Sekijima | B60W 40/08 |
| | | | 701/25 |
| 2019/0143968 A1* | 5/2019 | Song | B60W 30/18163 |
| | | | 701/301 |

FOREIGN PATENT DOCUMENTS

| | | |
|---|---|---|
| DE | 102015001971 | 8/2016 |
| DE | 102015011564 | 3/2017 |
| DE | 102015013299 | 4/2017 |

\* cited by examiner

SYSTEM AND METHOD FOR HANDLING EXCEPTIONAL SCENARIOS

BACKGROUND

A system for handling exceptional scenarios in a motor vehicle and a corresponding method are disclosed herein. This system and method are usable in particular to assist the driver in exceptional scenarios in motor vehicles with driver assistance systems or comfort systems. Details in this regard are defined in the claims; in addition, the description and the drawings contain relevant information concerning the system and the operating principle, and also concerning variants of the system and of the method.

TECHNICAL FIELD

Driver assistance systems detect the vehicle surroundings based on signals from surroundings sensors such as radar, lidar, video, and/or ultrasonic receivers, and evaluate the vehicle surroundings. They assist the driver in many driving situations and thus increase the driving comfort. They allow more stress-free and comfortable driving, parking, and maneuvering of the motor vehicle. Thus, for example, a congestion assistant assists the driver, also in heavy or congested traffic, to reach the destination in a relaxed manner. As a semiautomatic comfort function, the system takes over the longitudinal and transverse guidance of the motor vehicle; it can automatically start, accelerate, and brake, and within limits can autonomously steer. Adaptive cruise control (ACC), for example, assists the driver in maintaining a safe distance from the preceding motor vehicle. During travel, the ACC maintains a speed specified by the driver, or may adapt the speed to changing traffic conditions by autonomously letting up on the accelerator braking, or accelerating. In some variants, the system may also autonomously brake the motor vehicle to a standstill and automatically restart the vehicle after being enabled by the driver. A surroundings observation system also recognizes critical distance situations by means of radar/laser sensors, for example, and assists in shortening the stopping distance of the motor vehicle. In exceptional or hazard situations, the system warns the driver by visual, acoustic, or haptic means. The above examples are not all-inclusive; however, one characteristic of ail such driver assistance systems or comfort systems is that they are intended for certain driving or hazard situations. If the motor vehicle is in an exceptional situation for which it is actually not intended on a regular basis, it is difficult to predict the effect the driver assistance system or comfort system will have on the operation of the motor vehicle.

In exceptional scenarios, for example when the motor vehicle is in an automatic car wash stall, or on a ferry or a motorail, or in a confined parking garage situation, or the vehicle is to be towed within the scope of breakdown service, or the like, as a result of these driver assistance systems or comfort systems a situation is specified to them by their surroundings sensors, and the evaluation logic system of these driver assistance systems or comfort systems triggers an action that does not correspond to what the driver desires in this situation. In individual cases this may be annoying, but may also become objectionable or even hazardous, and may also result in damage to the vehicle. Thus, for example, for a motor vehicle with a collision avoidance system (CAS), the motor vehicle being present in an automatic car wash stall, a presumed obstacle may be specified for the radar sensor due to the wash brushes rotating directly in front of it. The signal evaluation of the radar signals by the evaluation logic system of the collision avoidance system causes the wheels of the vehicle to be braked or even locked. This prevents the vehicle from driving through the automatic oar wash stall under its own power. In addition, during towing in a breakdown situation, for example the towing motor vehicle may represent a presumed obstacle for the collision avoidance system of the host motor vehicle, as the result of which the driver assistance system brakes or locks the wheels of the towed vehicle. Another driver assistance system automatically locks the wheels of the vehicle when it is at a standstill for a brief time, for example a few seconds. These are only several examples in which the driver assistance system or comfort system has an adverse effect on the operation of the vehicle. In light of the increasing number of these systems and their embedding into the electronics system of the vehicle, switching off, suppressing, or reducing the functional scope of such driver assistance systems or comfort systems is not always simple for the driver; in many cases, the driver does not even have knowledge of the presence of these individual systems and their possible or actual (faulty) interventions. In addition, finding these systems in the menu structure of the vehicle information system may represent a challenge. This is all the more so due to the feet that selecting from increasingly extensive choices in the vehicle information system may create considerable stress for the driver under the time pressure of the exceptional situation.

Underlying Problem

With regard to the growing prevalence and complexity of driver assistance systems or comfort systems, to an increasing extent these systems intervene unexpectedly, erroneously, or with interference in the functionality of the vehicle, outside the scenarios intended for the intervention; the object is to reduce or prevent such.

Proposed Solution

To this end, a control system is proposed for influencing at least one driver assistance system or comfort system associated with a host motor vehicle when the motor vehicle is in an exceptional scenario. The motor vehicle has a surroundings sensor system for supplying the driver assistance system or comfort system with information concerning the vehicle surroundings and/or the traffic situation the host motor vehicle is in. This driver assistance system or comfort system is configured for also influencing the longitudinal and/or transverse guidance of the motor vehicle in driving or hazard situations. For recognizing an exceptional scenario, the control system is configured for evaluating the information from the surroundings sensor system and/or a switching device to be actuated by the driver of the motor vehicle in order to at least temporarily switch off, suppress, or reduce the functionality of the driver assistance system or comfort system, based on this evaluation.

Further Embodiments and Advantageous Refinements

In one variant, the control system is configured and intended for at least temporarily switching off, suppressing, or reducing the functionality of all driver assistance systems or comfort systems associated with the host motor vehicle by means of the switching device to be actuated by the driver of the motor vehicle.

In another variant, the control system is configured and intended for switching off, suppressing, or reducing the functionality of the at least one driver assistance system or comfort system, at least to the extent that this influences the longitudinal or transverse guidance of the motor vehicle, by signaling to steering, acceleration, and or deceleration devices of the motor vehicle. For example, acoustic/visual/haptic information is further output to the driver. This allows the driver to recognize the presence of an exceptional scenario without the driving operation of the motor vehicle being thereby affected. Thus, for example, in an automatic car wash stall, although a collision avoidance system specifies a presumed obstacle to the radar sensor due to the wash brushes rotating directly in front of it, this presumed obstacle is, for example, also acoustically signaled to the driver. However, the control system prevents the brakes of the motor vehicle from being actuated due to a corresponding intervention/signal in the collision avoidance system.

In another variant, for recognizing an exceptional scenario, the control system is configured and intended for evaluating and checking the plausibility of the information from the surroundings sensor system, independently of the at least one driver assistance system or comfort system, in order to at least temporarily switch off, suppress, or reduce the functionality of the at least one driver assistance system or comfort system, based on this evaluation and plausibility checking. For this purpose, the control system may obtain more information from the surroundings sensor system than any of the individual driver assistance systems or comfort systems in order to check the plausibility of the presence of an exceptional scenario, based on this information.

Lastly, a control method is proposed for influencing at least one driver assistance system or comfort system associated with a host motor vehicle when the motor vehicle is in an exceptional scenario, wherein a surroundings sensor system supplies the driver assistance system or comfort system with information concerning the vehicle surroundings and/or the traffic situation the host motor vehicle is in; this driver assistance system or comfort system also influences the longitudinal and/or transverse guidance of the motor vehicle in driving or hazard situations; and for recognizing an exceptional scenario, the control system evaluates the information from the surroundings sensor system and/or a switching device to be actuated by the driver of the motor vehicle in order to at least temporarily switch off, suppress, or reduce the functionality of the at least one driver assistance system or comfort system, based on this evaluation.

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein, also Independently of their grouping in the claims or their back-references. The dimensions and proportions of the components shown in the figures are not necessarily to scale, and in the embodiments to be implemented may differ from those illustrated herein.

DETAILED DESCRIPTION OF THE DRAWINGS

Figure 1:
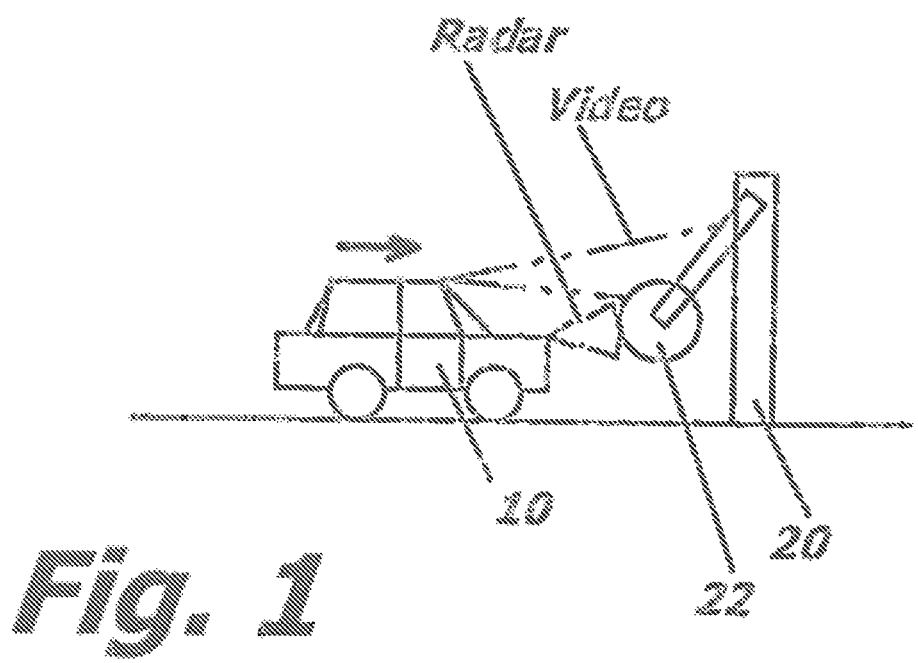
FIG. 1 schematically shows a driving situation in which a host vehicle intends to drive into an automatic car wash stall.
Figure 2:
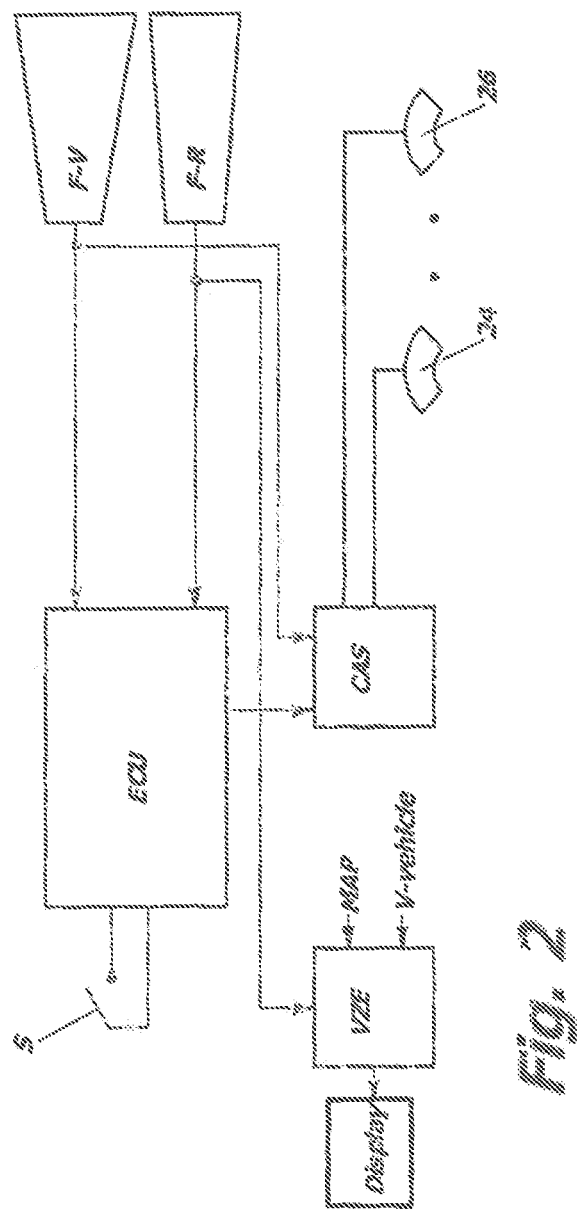
FIG. 2 schematically shows a traffic sign recognition system and a collision avoidance system of the motor vehicle of FIG. 1.

FIG. 1 schematically shows a driving situation in which a host (motor) vehicle 10 intends to drive into an automatic car wash stall 20. In the illustrated variant, the motor vehicle 10 is equipped with a traffic sign recognition system VZE and a collision avoidance system CAS as driver assistance/comfort systems (also see FIG. 2). For this purpose, the motor vehicle 10 has a surroundings sensor system for supplying the driver assistance systems or comfort systems with information concerning the vehicle surroundings and/or the traffic situation the host motor vehicle is in. In one variant not further depicted here, the surroundings sensor system includes radar sensors and (infrared and daylight) (video) cameras with which the surroundings situation in front of and to the sides of the vehicle 10 is detected and evaluated. The situation of the host vehicle 10 is determined and continuously provided to a control system ECU by use of this surroundings sensor system. For influencing these driver assistance systems or comfort systems associated with the motor vehicle, for the case that the motor vehicle is in an exceptional scenario the control system has an evaluation electronics system ECU for recognizing the exceptional scenario. The evaluation electronics system ECU is thus designed as a separate component, as in FIG. 2. However, it may also be implemented in one of the other electronic control systems in the motor vehicle. The control system ECU includes a computer, program/data memories, input/output devices, etc. (not illustrated in greater detail). In the present variant, the traffic sign recognition system VZE is video-based and the collision avoidance system CAS is radar-based. For this purpose, the motor vehicle 10 has a front video camera F-V and a front radar transceiver F-R, whose signals are supplied to the traffic sign recognition system VZE and the collision avoidance system CAS.

The traffic sign recognition system VZE, as a driver assistance and comfort system, supplies information in real time concerning the most Important direction signs and prohibition signs along the route of the motor vehicle 10. For this purpose, the traffic sign recognition system VZE uses the video camera to detect the relevant traffic signs and to depict them in the multifunction display, in the radio and navigation system display, and/or in the head-up display of the motor vehicle 10, depending on the vehicle equipment. For example, speed limits, city exit signs, no passing signs, as well as supplemental characters and corresponding prohibition symbols are displayed. The traffic sign recognition system VZE processes three sources of information: the traffic signs detected by the camera, information of the navigation device MAP, and current vehicle data in the form of the vehicle speed V-vehicle.

The collision avoidance system CAS, as a driver assistance system in hazard situations, also influences the longitudinal and/or transverse guidance of the motor vehicle 10 by actuating the brakes 24-26 of the wheels of the motor vehicle 10 when the front radar transceiver F-R recognizes an obstacle directly in front of the motor vehicle 10.

To handle exceptional scenarios, for example in which the motor vehicle is to drive into an automatic car wash or onto a ferry or a motorail, or the motor vehicle is to maneuver in a confined parking garage situation, or the vehicle is to be towed within the scope of a breakdown service, or the like, in one variant the evaluation electronics system ECU evaluates the information from the surroundings sensor system in order to switch off, suppress, or reduce the functionality of the driver assistance system or comfort system, based on this evaluation.

In an alternative or additional variant, the evaluation electronics system ECU evaluates a switching device S which is to be actuated by the driver of the motor vehicle, and which the driver may actuate to cause the functionality of the driver assistance system or comfort system to be switched off, suppressed, or reduced.

For recognizing exceptional scenarios, the control system evaluates the information from the surroundings sensor system, independently of the driver assistance system or comfort system, and checks it for plausibility. For example, in the collision avoidance system CAS, the evaluation of the radar signals during an attempt to drive into an automatic car wash signals the wash brushes in front of the motor vehicle as an obstacle. Consequently, the actuation of the brakes of the motor vehicle would then take place. However, based on the data from the video camera, the evaluation electronics system ECU is capable of detecting the automatic car wash and its wash brushes in front of the motor vehicle, and recognizing this exceptional scenario within the scope of a plausibility check. Based on this evaluation and plausibility check, the evaluation electronics system ECU then causes the functionality of the collision avoidance system CAS to be reduced to the extent that the brakes are not actuated to prevent a collision with the wash brushes. The motor vehicle 10 may thus be driven through the automatic car wash in the customary manner. The control system thus obtains more information from the surroundings sensor system than any of the individual driver assistance systems or comfort systems in order to check the plausibility of the presence of an exceptional scenario, based on this information.

Instead of the complex evaluation and plausibility checking of the information from the surroundings sensor system and the switching off, suppression, or reduction, based thereon, of the functionality of the driver assistance system or comfort system, by use of the switch S the driver may also switch off, suppress, or reduce the functionality of the driver assistance system or comfort system.

The variants described above as well as their design and operational aspects are used solely for better understanding of the structure, the operating principle, and the properties; they do not limit the disclosure to the exemplary embodiments, for example. The figures are sometimes schematic, and important properties and effects are sometimes illustrated in much larger scale, in order to clarify the functions, functional principles, technical embodiments, and features. Any operating principle, any principle, any technical embodiment and any feature that is disclosed in the figures or in the text, together with all claims, may be freely and arbitrarily combined with any feature in the text and with the other figures, other operating principles, principles, technical embodiments, and features that are contained in the present disclosure or that result therefrom, so that all conceivable combinations of the described variants are to be assigned. Also encompassed are combinations between all individual statements in the text, i.e., in any section of the description, in the claims, as well as combinations between various variants in the text, in the claims, and in the figures. Furthermore, the claims do not limit the disclosure, or thus, the combination options of all disclosed features with one another. All disclosed features are also explicitly disclosed herein, individually and in combination with all other features.

The invention claimed is:

1. A control system for influencing at least one driver assistance system or comfort system associated with a host motor vehicle when the host motor vehicle is in an exceptional scenario, wherein
   the host motor vehicle has a surroundings sensor system, including a video camera that is configured for detecting the relevant traffic signs, for supplying the at least one driver assistance system or comfort system with information concerning the vehicle surroundings and/or the traffic situation the host motor vehicle is in;
   the at least one driver assistance system or comfort system is configured for also influencing the longitudinal and/or transverse guidance of the host motor vehicle in driving or hazard situations;
   for recognizing an exceptional scenario, the control system is configured for evaluating the information, which comprises traffic signs detected with the video camera, from the surroundings sensor system and a switching device to be actuated by the driver of the host motor vehicle in order to at least temporarily suppress or reduce the functionality of the at least one driver assistance system or comfort system, based on this evaluation at least to the extent that this influences the longitudinal or transverse guidance of the host motor vehicle, by signaling to steering, acceleration, and/or deceleration devices of the host motor vehicle.

2. The control system according to claim 1, wherein the functionality of all driver assistance systems or comfort systems associated with the host motor vehicle is to be at least temporarily suppressed or reduced by means of the switching device to be actuated by the driver of the host motor vehicle.

3. The control system according to claim 1, wherein the functionality of the at least one driver assistance system or comfort system is to be suppressed or reduced, at least to the extent that this influences the longitudinal or transverse guidance of the host motor vehicle, by signaling to steering, acceleration, and or deceleration devices of the host motor vehicle.

4. The control system according to claim 1, wherein for recognizing an exceptional scenario, the control system evaluates and checks the plausibility of the information from the surroundings sensor system, independently of the at least one driver assistance system or comfort system, in order to at least temporarily suppress or reduce the functionality of the at least one driver assistance system or comfort system, based on this evaluation and plausibility checking.

5. The control system according to claim 1, wherein the control system obtains more information from the surroundings sensor system than any of the individual driver assistance systems or comfort systems in order to check the plausibility of the presence of an exceptional scenario, based on this information.

6. The control system according to claim 1, wherein the motor vehicle is in an exceptional situation when the motor vehicle is in an automatic car wash stall, on a ferry, on a motorail, in a confined parking garage, and/or to be towed.

7. A control method for influencing at least one driver assistance system or comfort system associated with a host motor vehicle when the host motor vehicle is in an exceptional scenario, wherein
   a surroundings sensor system, including a video camera that is configured for detecting the relevant traffic signs, supplies the at least one driver assistance system or comfort system with information concerning the vehicle surroundings and/or the traffic situation the host motor vehicle is in;

the at least one driver assistance system or comfort system also influences the longitudinal and/or transverse guidance of the host motor vehicle in driving or hazard situations; and for recognizing an exceptional scenario, a control system evaluates the information, which comprises traffic signs detected with the video camera, from the surroundings sensor system and a switching device to be actuated by the driver of the host motor vehicle in order to at least temporarily suppress or reduce the functionality of the at least one driver assistance system or comfort system, based on this evaluation at least to the extent that this influences the longitudinal or transverse guidance of the host motor vehicle, by signaling to steering, acceleration, and/or deceleration devices of the host motor vehicle.

8. The control method according to claim 7, wherein the motor vehicle is in an exceptional situation when the motor vehicle is in an automatic car wash stall, on a ferry, on a motorail, in a confined parking garage, and/or to be towed.

9. A system for handling exceptional scenarios in a motor vehicle, comprising:

at least one driver assistance system or comfort system associated with the motor vehicle, the at least one driver assistance system or comfort system influencing the longitudinal and/or transverse guidance of the motor vehicle in driving or hazard situations;

a surroundings sensor system associated with the motor vehicle, the surroundings sensor system supplying the at least one driver assistance system or comfort system with information concerning the vehicle surroundings and/or the traffic situation the motor vehicle is in, the surroundings sensor system including a video camera that detects relevant traffic signs; and a control system that evaluates the information from the surroundings sensor system and a switching device to be actuated by the driver of the motor vehicle to recognize when the motor vehicle is in an exceptional scenario, the information from the surroundings sensor including traffic signs detected with the video camera, the control system at least temporarily suppressing or reducing the functionality of the at least one driver assistance system or comfort system once an exceptional scenario is recognized based on the evaluation, the functionality of the at least one driver assistance system or comfort system being suppressed or reduced, at least to the extent that this influences the longitudinal or transverse guidance of the motor vehicle, by signaling to steering, acceleration, and/or deceleration devices of the motor vehicle.

10. The system according to claim 9, wherein the functionality of all driver assistance systems or comfort systems associated with the motor vehicle is to be at least temporarily suppressed or reduced by means of the switching device to be actuated by the driver of the motor vehicle.

11. The system according to claim 9, wherein the control system evaluates and checks the plausibility of the information from the surroundings sensor system, independently of the at least one driver assistance system or comfort system, to recognize when the motor vehicle is in an exceptional scenario, the control system at least temporarily suppressing or reducing the functionality of the at least one driver assistance system or comfort system once an exceptional scenario is recognized based on the evaluation and plausibility checking.

12. The control system according to claim 9, wherein the control system obtains more information from the surroundings sensor system than any of the individual driver assistance systems or comfort systems, the control system checking the plausibility of the presence of an exceptional scenario based on the obtained information.

\* \* \* \* \*